UNITED STATES PATENT OFFICE.

PETER FIREMAN, OF TRENTON, NEW JERSEY, ASSIGNOR TO MAGNETIC PIGMENT COMPANY, A CORPORATION OF NEW YORK.

PIGMENT AND METHOD OF PRODUCING THE SAME.

1,420,985.  Specification of Letters Patent.  Patented June 27, 1922.

No Drawing.  Application filed April 8, 1921. Serial No. 459,721.

*To all whom it may concern:*

Be it known that I, PETER FIREMAN, a citizen of the United States, residing at Trenton, in the county of Mercer, State of New Jersey, have invented certain new and useful Improvements in Pigments and Methods of Producing the Same; and I do hereby declare the following to be a full, clear, and exact description of the invention, such as will enable others skilled in the art to which it appertains to make and use the same.

The invention relates to pigments, particularly such as are adapted to provide the body of fine printing inks and has for its object the production of a dark brown pigment of fine texture from relatively inexpensive material and in an economical manner.

I have previously described in United States Letters Patent No. 802,928 and No. 857,044 methods of preparing black pigments in the form of ferro-ferric oxides by oxidizing precipitated ferrous hydroxide. According to the former patent the pigment contains ferrous and ferric iron in the ratio of 1:2 and is prepared by selective oxidation to a degree so limited that the desired product results from the unavoidable oxidation during the drying of the pigment in the presence of air; or by oxidation to the extent necessary to provide the desired ratio of ferrous and ferric iron with subsequent drying out of contact with air. Following the latter patent, a different product in which the ratio of ferrous to ferric iron varies from 1:0.5 up to 1:2, is produced by interrupting the oxidation before the latter ratio was reached and subsequently drying the pigment out of contact with air. Both of these pigments are jet black in color, leaving no brown streaks when rubbed on white paper. The pigments possess a velvety texture and are admirably adapted for the production of black ink.

In a copending application, Serial No. 301,028, I have described a later invention directed to the production of yellow and brown pigments by regulated oxidation of ferrous hydroxide precipitated under predetermined conditions and with selected precipitants. The pigments thus produced possess marked characteristics which adapts them for use in printing inks and have a velvety texture and a high lustre. The yellow pigments are lemon yellow and reddish yellow and have a chemical composition represented by $Fe_2O_3H_2O$, while the browns are reddish brown or tan in shade. The reddish brown pigment has a composition $Fe_2O_3$ and the tan pigments correspond to $3Fe_2O_3H_2O$.

My present invention is directed to the production of dark brown pigments which may be termed black browns having the chemical composition $Fe_2O_3$ and while the composition is that of ordinary ferric oxide, the pigment produced as hereinafter described differs therefrom in physical state and possibly in physico-chemical arrangement of the iron and oxygen. It is free from grit, incorporates well with oil, has a good body and is particularly adapted for rotogravure and other forms of printing requiring fine ink.

In the manufacture of pigments such as I have described, I oxidize precipitated ferrous hydroxide, but instead of retarding oxidation and stopping selectively when the products described in the earlier patents and application are produced, I continue the oxidation preferably at a boiling temperature for some hours longer than is necessary to produce the yellow, brown and black pigments. To produce a black pigment, for example, oxidation for five hours is sufficient and yellows and browns may be produced in a shorter period. The present invention, however, contemplates an extended oxidation of from 10 to 15 hours, more or less, to produce a completely oxidized and non-hydrated product. This product has a rich dark brown color and a high lustre. It is voluminous and has a low specific gravity.

More specifically, the details of the method involve the treatment of a solution of a ferrous salt, preferably the chloride, although other salts may be used, with an alkali metal or alkali earth metal carbonate or hydroxide, or in fact any precipitant capable of throwing down ferrous hydroxide. The precipitated hydroxide is then heated in the mother liquor by the injection of steam to raise the temperature to substantially the boiling point and air is introduced and disseminated through the material. Active oxidation is then continued for the time required to complete the oxidation of the ferrous hydroxide to ferric oxide. The oxide is then filtered and washed and is dried. Since oxidation is complete it is not necessary to exclude air during the drying operation. The dried pigment is then ready for use.

From the foregoing it will be apparent that I have devised and perfected a novel pigment and a method of producing it in an expeditious and commercially practicable manner. The details of the operation may be varied somewhat and varying conditions affect somewhat the color and texture of the product which, however, when produced substantially in the manner described provides a superior base for printing inks and is, moreover, adapted for various other uses such as are obvious from the character of the material.

My invention comprehends broadly, therefore, a dark brown pigment produced by unrestricted oxidation of precipitated ferrous hydroxide and the method whereby this pigment is prepared.

I claim:—

1. A dark brown pigment produced by unrestrained and substantially complete oxidation of precipitated ferrous hydroxide in the mother liquor at high temperature.

2. A dark brown pigment produced by substantially complete oxidation of precipitated ferrous hydroxide at substantially the boiling point of the mother liquor.

3. A dark brown pigment of velvety texture, adapted to form the body of printing inks and having a chemical composition represented by $Fe_2O_3$.

4. A dark brown pigment having a chemical composition represented by $Fe_2O_3$ and produced by oxidation of ferrous hydroxide in the mother liquor.

5. A method of producing a dark brown pigment which comprises, precipitating ferrous hydroxide from a solution of a ferrous salt, oxidizing the precipitate in the mother liquor to ferric oxide and drying the product.

6. A method of producing a dark brown pigment which comprises, precipitating ferrous hydroxide from a solution of a ferrous salt and subjecting the precipitate in said solution to the action of air at an elevated temperature until said precipitate is converted into ferric oxide.

7. A method of producing a dark brown pigment which comprises, precipitating ferrous hydroxide from a solution of a ferrous salt and subjecting the precipitate to unrestrained oxidation in the mother liquor for an extended period.

8. A method of producing a dark brown pigment which comprises, precipitating ferrous hydroxide from a solution of a ferrous salt and subjecting the precipitate to unrestrained oxidation for an extended period ranging from 10 to 15 hours.

9. A method of producing a dark brown pigment which comprises, precipitating ferrous hydroxide from a solution of a ferrous salt, heating the solution to substantially the boiling temperature and disseminating air through said solution to oxidize said precipitate until it is converted into ferric oxide.

10. A method of producing a dark brown pigment which comprises, precipitating ferrous hydroxide from a solution of a ferrous salt, heating said solution, and subjecting the precipitate therein to the action of air for a period ranging from 10 to 15 hours.

In testimony whereof I affix my signature.

PETER FIREMAN.